Jan. 24, 1933.  H. F. TÖNNIES  1,895,271
PHOTOGRAPHIC EXPOSUREMETER
Filed Oct. 24, 1930
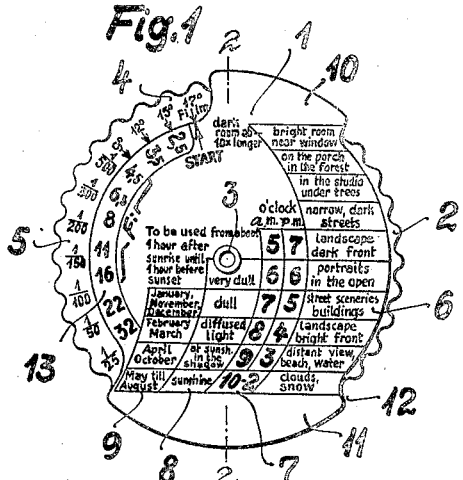
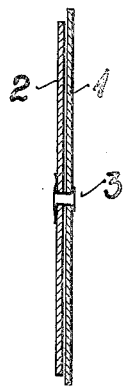
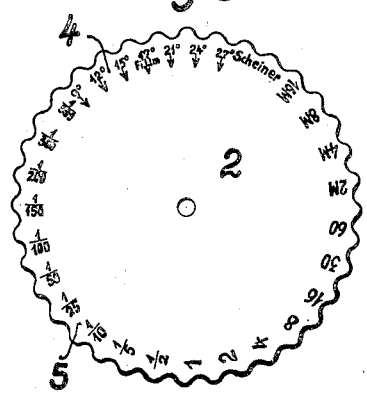
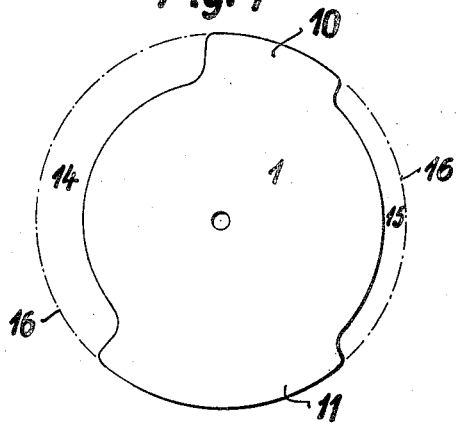
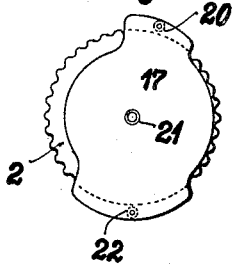
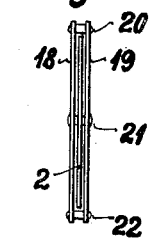
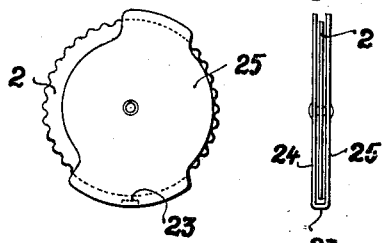
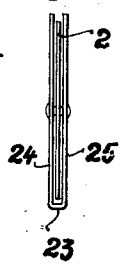
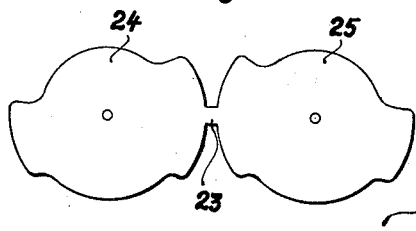
Inventor;
Hans Ferdinand Tönnies Patented Jan. 24, 1933

1,895,271

UNITED STATES PATENT OFFICE

HANS FERDINAND TÖNNIES, OF ALTONA-GROSSFLOTTBEK, GERMANY

PHOTOGRAPHIC EXPOSUREMETER

Application filed October 24, 1930. Serial No. 490,907.

The present invention relates to photographic exposuremeters and more particularly to tabular exposuremeters, containing scales arranged on plates or disks. The object of the invention is to construct and arrange an exposuremeter of this kind in a way which makes the operating of it in the highest obtainable way simple and convenient to the amateur photographer. The object is likewise to have these advantages combined in an instrument of very small and convenient size.

Reference is to be had to the accompanying drawing in which:

Fig. 1 is a front view of the exposuremeter;
Fig. 2 is a section on line 2—2 of Fig. 1;
Fig. 3 is a view of one plate of the instrument;
Fig. 4 is a view of another plate of it;
Figs. 5 and 6 show a variation of the form of Figs. 1 and 2;
Figs. 7 and 8 show another variation;
Fig. 9 shows a plate used in the variation of Figs. 7 and 8 unfolded.

The exposuremeter is composed of two parts, a stable plate 1, by which the instrument is held when using it, and a turnable plate 2 below it, which is attached to it by a rivet 3, having an elastic head or washer as clearly shown in Figure 2. The plates are preferably made of celluloid. The stable plate is shaped as in Figs. 1 and 4, possessing two projecting parts, 10, 11, by which it is held between thumb and forefinger, furthermore a long aperture 15 at the right side and a somewhat longer and deeper aperture 14 at the left side. The dotted line 16 indicates the periphery of the circle enclosing the parts 10 and 11. The turnable plate 2 is round and provided with a notched border. I prefer giving the notches a wavelike shape as shown in Figs. 1 and 3.

On the plate 1 are arranged side by side four scales, 6, 7, 8, 9. The longest scale 6, of the objects to be photographed, borders the aperture 15 at the right side of the plate. The other scales are arranged staircase-like, the scale 7 of the day-times being shorter than the scale 6, the next scale 8 of the light-conditions being shorter than scale 7, and the shortest scale 9 of the months closing the series. The scales are separated from each other by semicircular lines. These lines are crossed by parallel lines, which form rows of squares that contain the single data of the scales. The data of every scale which allow the shortest time of exposure are arranged in the lowest row, the rows above it require longer times of exposure successively. At the left side is circularly printed a scale 13 of the camera-lens-diaphragms and next to it an arrow with the word "Start" below it. Furthermore the plate carries the instruction that the exposuremeter is correct only from about one hour after sunrise until one hour before sunset.

Plate 2 carries two scales arranged circularly; one a scale 5 of the times of exposure and the other a scale 4 of the plate speeds, for instance in degrees Scheiner.

For finding the time of exposure the instrument is used as follows: The instrument is held by the plate 1, and the plate 2 is revolved until the degree of the plate speed of scale 4 is opposite the arrow marked "Start". Now for instance it may be supposed that an exposure has to be made under the following conditions: On a plate or film of 17° Scheiner "street sceneries" at "4 o'clock p. m." at "diffused light" in "May". After having set "17° Scheiner" over the arrow, (1) put the point of your finger in the notch in line with the words "Street sceneries" and push it down until stopped by the edge 12 of the projecting part 11 of plate 1. Furthermore push down likewise (2) the notch in line with "4 o'clock p. m."; (3) the notch in line with "diffused light". As the word May is already in the lowest line the notch in line with it will not be moved. After this procedure you will find the scale 5 of the times of exposure, a sufficient long part of it being visible through the aperture 14, in correct position opposite the scale 13 of the lens-diaphragms, for instance opposite F: 4.5 the time of 1/50 second. The use of the exposuremeter is that way quick, simple and convenient at the utmost.

Besides the arrangement and shape of the plates 1 and 2, especially that of plate 1, the arrangement of the scales on the plates and the length of their graduation are very important features of the invention. Up to now the scales of tabular exposuremeters are made so that their graduations were the same. For instance the width between the data of the scales 6—9 were the same as between the data of the scales 5 and 13. If the graduations of all scales are made that way alike, there results only two possibilities, viz. to crowd them with data and make them unhandy or to commit faults. I avoid these drawbacks by giving the scales 6—9, which form the basic elements for finding the time of exposure (conditions outside the camera), a smaller graduation than the scales 5 and 13, which form the interior photographic conditions, the scale 13 representing the lens openings and scale 5 the time of exposure.

The importance of this kind of differing graduation may be explained by the following consideration.

If the object of the invention will be obtained, namely; to have the exposuremeter constructed and arranged so that on a small sized instrument, which can be quickly and conveniently handled, all important factors are very clearly visible, it is essential to have them reduced to the practical limit. This limit is given in a certain way by the shutter of the camera. Nearly all kinds of shutters show the same time indications on them, that is 1 second, ½, ⅕, 1/10, 1/25, 1/50, 1/100 second etc. The relation of the length of time of any two adjacent indications between each other is accordingly in the average, 1:2. In the adjacent scale of diaphragms "F:" I am using the same difference-relation 1:2, employing those data that are mostly shown by the shutters of the higher class cameras, viz. F:4.5; 6.3 etc.; so that $4.5^2 : 6.3^2 = 1:2$. The problem is now to put the intervals of the data of the scales 5 and 13 into the correct relation to those of the scales 6—9. Practical experience shows that the decline of the sun from June to December in the middle of the day demands a prolongation of the time of exposure in the relation of about 1:5 in the average latitude of the United States. I arrange the months of the year in four squares. The light-value of the squares grows gradually in the same proportion. The relation of the light-values between the different squares of the scales 6—9 is in accordance to the arrangement the same. For instance to photograph clouds in January at sunshine at 10–2 o'clock will need the same time of exposure as for photographing street sceneries in May at sunshine at 10–2 o'clock. Now if the scales 5 and 13 had the same graduation as the scales 6—9, it would mean that if an exposure were to be made in the middle of the day under the same conditions either in January or in May, the time of exposure in January had to be 8 times longer than in May, because the light-value relation between the single data of the scales 5 and 13 shows the proportion 1:2. That would give a light-value relation between January and May of 1:8, but the relation 1:8 is wrong because the experience shows that the real light-value between January and May (if the middle of the day is counted) is very nearly like 1:5. In order to avoid faults and to attain instead a proper function of the exposuremeter I give the data of the scales 5 and 13 greater intervals than those of the scales 6:9, so that if an exposure is made under the same conditions in January and in May, for instance when photographing "street sceneries" at "12 o'clock" at "sunshine" the exposuremeter shows for May opposite the diaphragm F:8 the time of 1/100 and for January the time of about 1/20 second, F:8 standing between 1/25 and 1/10, but nearer to 1/25. In this way the proper light-value relation between January and June of about 1:5 is ascertained.

In accordance to these arrangements I give the scales 6—9, where they border the edge of the plate 1, a graduation of 10 degrees, the notches along the edge of plate 2 the same graduation, but the scales 5 and 13 a graduation of about 13 degrees. The scale 4 is also graduated every 10 degrees because the sensibility degrees of the latter scale may be chosen accordingly. Although the relation of about 10 degrees to 13 degrees is meeting the practical demands, small alterations from this relation are possible.

Instead of making the exposuremeter of two plates it may also be composed of three plates 2, 18, 19, as in Figs. 5 and 6, the plates being joined by rivets 20, 21, 22. Or a plate forming two parts 24 and 25 (Fig. 9) connected by a small bridge 23 may be bent and joined with the plate 2 as shown in Figs. 7 and 8.

What I claim as my invention is:

1. A tabular exposuremeter of the type referred to, in combination with a round shaped, stationary plate and a notched disk, rotarily and elastically attached to said plate by a rivet, said stationary plate having two projecting portions facing each other and by which the device may be held, shoulders acting as finger stops, two lateral recesses in arc-shaped form and facing each other, scales upon the stationary plate and indications near and along the periphery of said rotatable disk, consisting in the notches of said disk having wavelike shape, the said scales being arranged in juxtaposition and forming rows of blocks in which the respective factors are printed, said blocks being constituted by semi-circular lines which are crossed by parallel lines, the one row of said blocks bordering the right-hand side recess, being made longest and the other rows of blocks being arranged in stair-case-like position, a circularly disposed scale of the diaphragms of the camera-lens at the border of the left-hand side recess, a starting arrow at the upper extremity of said diaphragm scale, the indications along the periphery of said rotatable disk comprising a scale for the exposure times and a scale for plate-speeds, the result indicating the exposure times to be selected and obtained by consecutively turning the said disk in succession of the respective factors being clearly readable in front of the corresponding diaphragms.

2. A tabular exposuremeter of the type referred to, in combination with a round shape, stationary plate and a notched disk, rotarily and elastically attached to said plate by a rivet, said stationary plate having two projecting portions facing each other and by which the device may be held, shoulders acting as finger stops, two lateral recesses in arc-shaped form and facing each other, scales upon the stationary plate and indications near and along the periphery of said rotatable disk, consisting in the notches of said disk having wavelike shape, the left-hand side recess having a more accentuated arc-shaped form than the right-hand side recess for the purpose of making said first named recess wider in depth and rendering the border of said rotatable disk clearly visible, the said scales being arranged in juxtaposition and forming rows of blocks in which the respective factors are printed, said blocks being constituted by semi-circular lines which are crossed by parallel lines, the one row of said blocks bordering the right-hand side recess, being made longest and the other rows of blocks being arranged in staircase-like position, a circularly disposed scale of the diasition, a circularly disposed scale of the diaphragms of the camera-lens at the border of the left-hand side recess, an arrow at the upper extremity of said diaphragm scale marking the starting point for the respective plate-speeds, the indications along the periphery of said rotatable disk comprising a scale for the exposure times and a scale for the plate-speeds, the said scale for the plate-speeds and the said scales-blocks having smaller made graduations than the scale for the diaphragms, the result indicating the exposure times to be selected and obtained by consecutively turning the said disk in succession of the respective factors being clearly readable in front of the corresponding diaphragms.

In testimony whereof I affix my signature.

HANS FERDINAND TÖNNIES.